United States Patent
Eyb

(10) Patent No.: US 7,758,313 B2
(45) Date of Patent: Jul. 20, 2010

(54) CARBON-GLASS-HYBRID SPAR FOR WIND TURBINE ROTORBLADES

(75) Inventor: Enno Eyb, Kiel (DE)

(73) Assignee: General Electric Company, Schenectady, NY (US)

(*) Notice: Subject to any disclaimer, the term of this patent is extended or adjusted under 35 U.S.C. 154(b) by 56 days.

(21) Appl. No.: 11/352,776

(22) Filed: Feb. 13, 2006

(65) Prior Publication Data

US 2010/0104447 A1    Apr. 29, 2010

(51) Int. Cl.
*F03D 1/06* (2006.01)
(52) U.S. Cl. .................. 416/226; 416/241 A
(58) Field of Classification Search .............. 416/226, 416/229 A, 230, 241 A
See application file for complete search history.

(56) References Cited

U.S. PATENT DOCUMENTS

| | | | |
|---|---|---|---|
| 3,691,000 A | 9/1972 | Kalnin | |
| 3,782,856 A * | 1/1974 | Salkind et al. | ............... 416/226 |
| 4,339,230 A | 7/1982 | Hill | |
| 4,846,908 A | 7/1989 | Aldrich et al. | |
| 4,976,587 A * | 12/1990 | Johnston et al. | ............. 416/230 |
| 5,016,516 A | 5/1991 | Aldrich et al. | |
| 5,376,595 A | 12/1994 | Zupancic et al. | |
| 6,527,849 B2 | 3/2003 | Dry | |
| 7,022,629 B2 | 4/2006 | Theriault | |
| 2005/0180853 A1* | 8/2005 | Grabau et al. | ........... 416/241 R |
| 2005/0186081 A1* | 8/2005 | Mohamed | .................. 416/226 |

FOREIGN PATENT DOCUMENTS

| | | |
|---|---|---|
| JP | 2002137307 A | 5/2002 |
| WO | 9421451 A1 | 9/1994 |
| WO | 2006002621 A1 | 1/2006 |

OTHER PUBLICATIONS

United States Statutory Invention, Registration Reg. No. H347, Published: Oct. 6, 1987, Applicant: Layden, et al.
DK Search Report, PA 2007 00218, Apr. 21, 2010, 1 page.

* cited by examiner

*Primary Examiner*—Edward Look
*Assistant Examiner*—Nathaniel Wiehe
(74) *Attorney, Agent, or Firm*—James McGinness, Esq.; Armstrong Teasdale LLP

(57) ABSTRACT

A fiber reinforced matrix for a wind turbine rotor blade includes glass fibers and carbon fibers embedded in the same matrix material.

10 Claims, 3 Drawing Sheets

CARBON-GLASS-HYBRID SPAR FOR WIND TURBINE ROTORBLADES

BACKGROUND OF THE INVENTION

This invention relates generally to a fiber reinforced matrix for a wind turbine rotor blade, and more particularly to a wind turbine rotor blade including such a fiber reinforced matrix.

Wind turbine blades are typically made by means of two blade shell halves of fiber reinforced polymer. When molded the two halves are glued together along the edges and via bracings, which prior thereto have been glued to the inner face of one of the blade shell halves. The other blade shell half is then arranged on top of the bracings and glued thereto and along the edges.

The blade shell halves per se are typically made by vacuum infusion, in which evenly distributed fibers, rovings, which are fiber bundles, bands of rovings or mats, which may be felt mats of single-fibers or woven mats of fiber rovings, are layered in a mold part and covered by a vacuum bag. By creating vacuum in the cavity between an inner face of the mould part and the vacuum bag resin is sucked into and fills the cavity containing the fiber material. In order to obtain the optimum distribution of resin, so-called distribution layers and distribution channels are often used between the vacuum bag and the fiber material.

The matrix material used, i.e. a polymer, is typically polyester or epoxy, and the fiber reinforcement is usually based on fiber glass. It is, however, also known to use carbon fibers which are stiffer than glass fibers, but have a smaller elongation at breakage than glass fibers. Carbon fibers are, however, encumbered by the drawback of being significantly more expensive than glass fibers, which is one of the reasons why wind turbine blades of carbon fiber-reinforced polymer are not widely used.

BRIEF DESCRIPTION OF THE INVENTION

A fiber reinforced matrix for a wind turbine rotor blade includes glass fibers and carbon fibers embedded in the same matrix material.

DETAILED DESCRIPTION OF THE INVENTION

Figure 1:
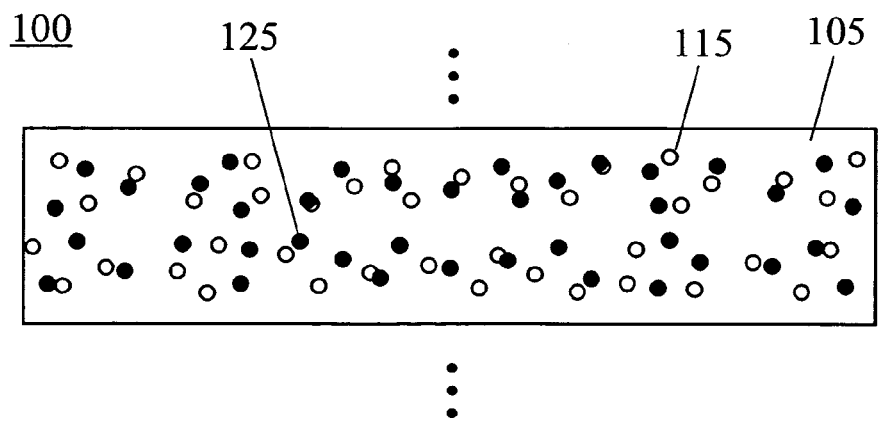
FIG. 1 is a cross-sectional view of a fiber reinforced hybrid material according to an embodiment of the present invention.

FIG. 1 is a cross-sectional view of a fiber reinforced hybrid material 100 according to an embodiment of the present invention. The hybrid material includes two different main types of fibers, carbon fibers 125 and glass fibers 115, which are shown in cross-section in FIG. 1. Glass fibers 115 and carbon fibers 125 are mixed with each other so that they are evenly distributed within matrix 105. Thus, glass fibers 115 are coupled to carbon fibers 125 via matrix material 105 and a hybrid mixed glass fiber/carbon fiber reinforced matrix is provided. As a result, the fiber reinforced hybrid material 100 has a compressive strain to failure which is higher than the compressive strain to failure of a pure carbon fiber reinforced material but also has a stiffness higher than that of a pure glass fiber reinforced material. Thus, the advantages of both fibers are combined while reducing the disadvantages thereof. Furthermore, the buckling resistance of the fiber reinforced material is improved compared to a pure carbon fiber reinforced material because of the increased thickness. However, the weight of the material is reduced with respect to pure glass fiber reinforced materials.

Figure 2:
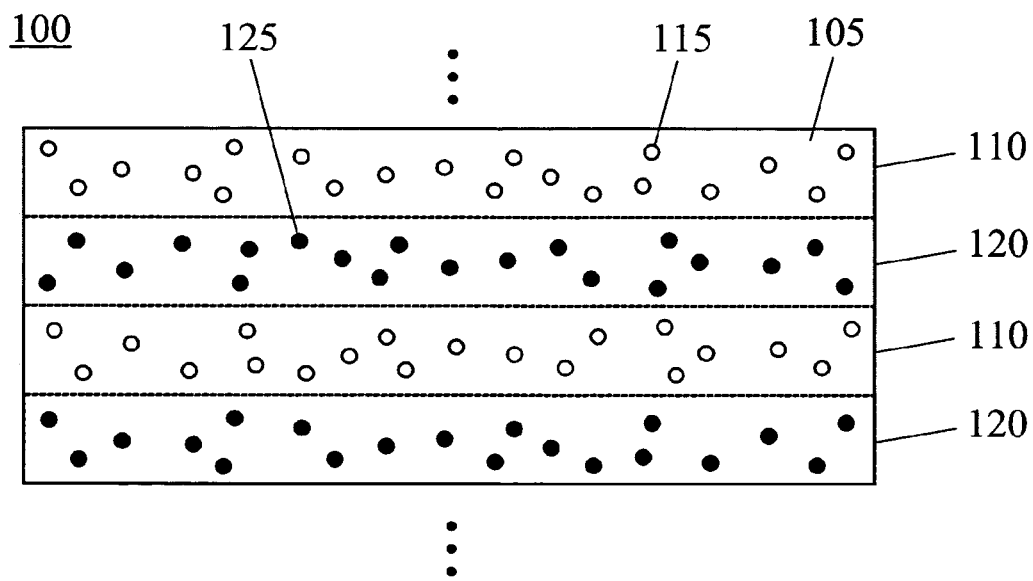
FIG. 2 is a cross-sectional view of a fiber reinforced hybrid material according to a further embodiment of the present invention.

A further embodiment of the present invention is shown in FIG. 2 Therein, hybrid material 100 has a layered structure with an alternating arrangement of glass fiber layers 110 and carbon fiber layers 120. The alternating fiber layers 110, 120 are embedded in a common shared matrix material 105. Thus, glass fibers 115 and carbon fibers 125 are coupled to each other via matrix 105.

Fibers 115, 125 are provided in any suitable form. In the exemplary embodiment, fibers 115, 125 are provided in the form of at least one of non-woven fabrics, woven fabrics and roving fabrics. Typically, fibers 115, 125 are provided as prefabricated mats.

According to one embodiment of the present invention, matrix material 105 is an epoxy resin or an epoxy novolac. According to another embodiment of the present invention, thermosetting resins are used as the matrix material, particularly epoxy resin, epoxy novolacs, polyesters, polyimides, both condensation and addition types, phenolic resins, and bismaleimides. The specific resins are selected according to the specific technical purpose the hybrid matrix is applied to. Particularly, the resin system is selected with respect to a particular fiber reinforcement for producing a finished hybrid fiber reinforced part having the desired mechanical and environmental properties. The resin is usually degassed under vacuum after mixing of a hardener/catalyst in the resin, to eliminate or remove all entrapped air from the liquid resin. The resin should therefore be capable of proceeding through a vacuum pressure cycle environment of heat and time without formation of gas bubbles or voids.

Figure 3:
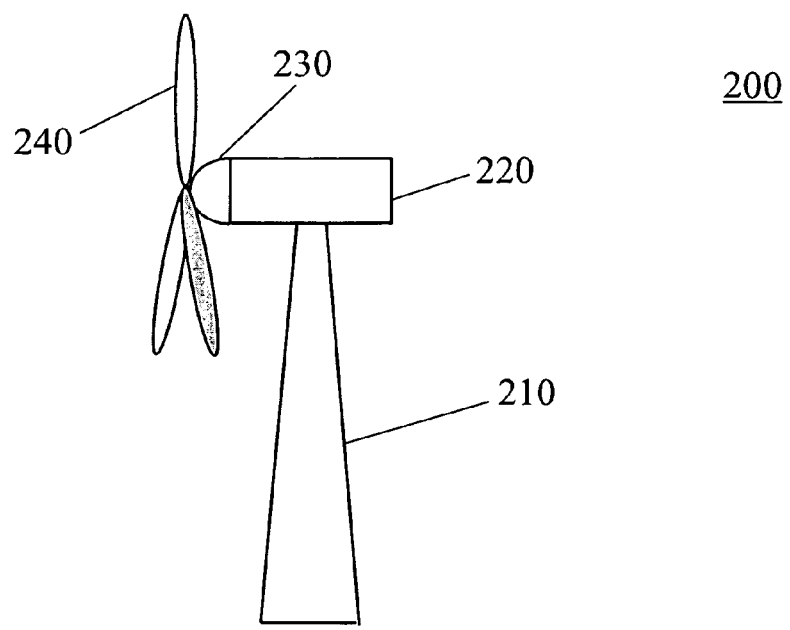
FIG. 3 is a schematic view of a wind turbine.

FIG. 3 is a schematic view of a wind turbine 200 including a tower 210 to which a machine nacelle 220 is mounted at its top end. A hub 230 having three rotor blades 240 attached thereto is mounted to a lateral end of machine nacelle 220.

Figure 4:
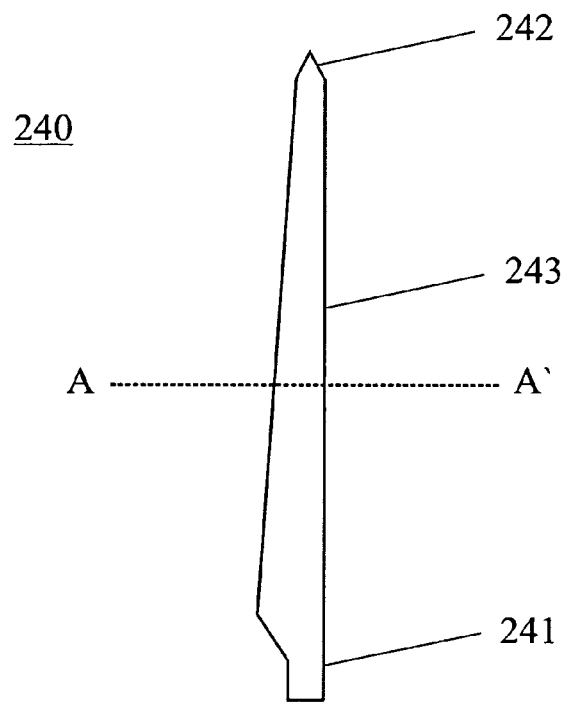
FIG. 4 is a front view of a wind turbine rotor blade.

The configuration of a rotor blade 240 is shown in FIG. 4. Therein, rotor blade 240 includes a root section 241 used to mount rotor blade 240 to hub 230. Opposite to root section 241, a tip end 242 of rotor blade 240 is disposed. A body section 243 of rotor blade 240 extends between root section 241 and tip end 242.

Figure 5:
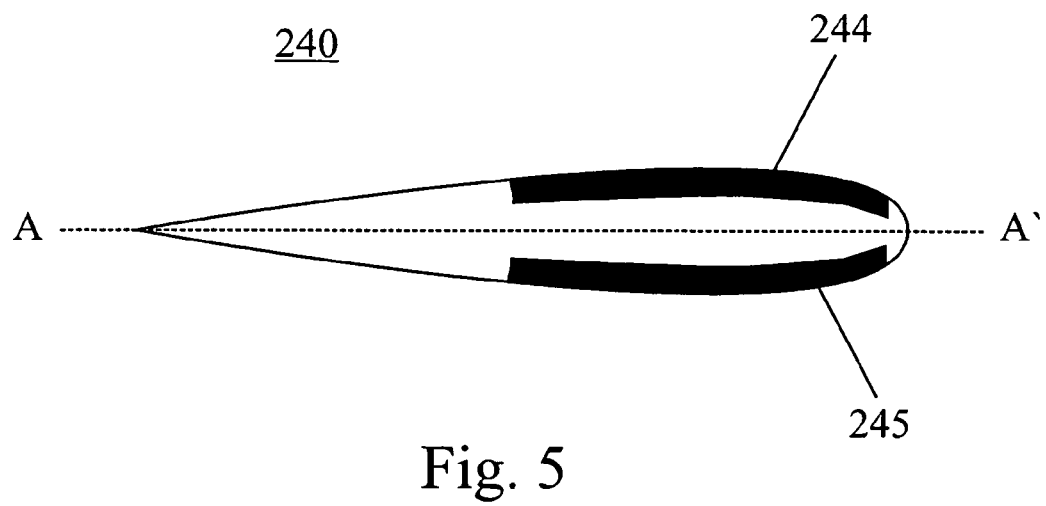
FIG. 5 is a cross-sectional view of a wind turbine rotor according to an embodiment of the present invention.

FIG. 5 illustrates a cross-section of body section 243 of rotor blade 240 according to an embodiment of the present invention along line A-A' shown in FIG. 4. Therein, sparcaps 244 and 245 for stiffening the blade shells are shown. Sparcaps 244, 245 are fabricated from a fiber reinforced hybrid material as described above. Thus, the stiffness of sparcaps 244, 245 is improved compared with conventional pure glass fiber sparcaps while their weight is reduced. Simultaneously, the compressive strain to failure and buckling resistance of sparcaps 244, 245 is improved compared with pure carbon fiber reinforced sparcaps while their costs are reduced. Thus, the use of an above-described fiber reinforced hybrid material results in an improved rotor blade 240.

Figure 6:
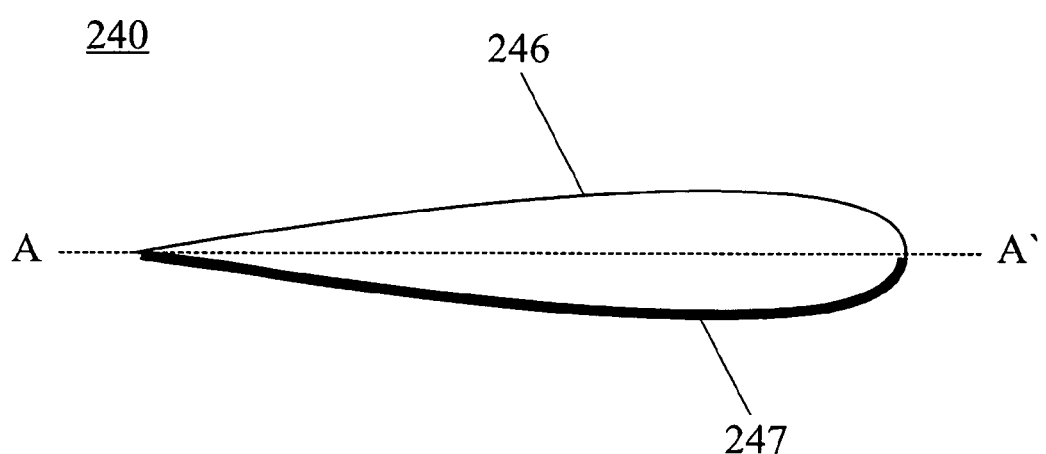
FIG. 6 is a cross-sectional view of a wind turbine rotor according to a first embodiment of the present invention.

A further embodiment of the present invention is shown in FIG. 6. Therein, rotor blade 240 includes a pressure side shell 246 and a suction side shell 247. Since a suction side of blade 240 is mainly subject to compressive load, it is desirable to use a material with suitable compressive strength for suction side shell 247. According to the embodiment shown in FIG. 6, suction side shell 247 of rotor blade 240 is fabricated from a glass fiber/carbon fiber hybrid material as described above. Thus, the compressive strain to failure of suction side shell 247 is improved compared to a pure carbon fiber reinforced plastic material while the stiffness and weight are improved compared to a conventional glass fiber shell.

Furthermore, the embodiments shown in FIG. 5 and FIG. 6 are combinable with each other such that sparcaps 244, 255 as well as suction side shell 247 are fabricated from the above-described glass fiber/carbon fiber hybrid material. In an alternative embodiment, only suction side sparcap 245 is manufactured from the glass fiber/carbon fiber hybrid material. Since the suction side of blade 240 is subject to high compressive loads, this also improves the strain to failure of the suction side of the rotor blade.

Having thus described the invention in detail, it should be apparent for a person skilled in the art that various modifications can be made in the present invention without departing from the spirit and scope of the following claims. A person skilled in the art will recognize that the fiber reinforced hybrid material according to the present invention combines the advantages of pure carbon fiber and glass fiber reinforced plastics while reducing their respective weaknesses. At the same time, the fiber reinforced hybrid material according to the present invention is available at reduced costs compared to pure carbon fiber reinforced plastics. Therefore, the fiber reinforced hybrid material may also be advantageously applied to technical fields other than wind turbines, e.g. elements for automobiles, rotor blades for helicopters, boats, bridges, piping systems or containers for the chemical industry. Furthermore, the use of the fiber reinforced hybrid material in wind turbines is not restricted to rotor blades but also includes parts of the hub, nacelle and/or tower of the wind turbine.

As described above, a fiber reinforced hybrid material for a wind turbine rotor blade includes glass fibers and carbon fibers which are embedded in the same matrix material. In other words, the glass fibers and the carbon fibers share a common matrix so that the glass fiber/carbon fiber hybrid material is integrally formed. According to the exemplary embodiment, the hybrid material is formed by alternately stacked layers of glass fibers and carbon fibers when seen in a cross sectional view. These alternating layers are embedded in a matrix material.

The exemplary material has a higher compressive strain to failure than a pure carbon fiber reinforced material. In addition, the stiffness of such a fiber reinforced hybrid material is higher than that of a pure glass fiber material. Thus, the above-described hybrid material combines the advantages of both materials while reducing their weaknesses. Furthermore, the buckling resistance of the material is improved compared to pure carbon fiber reinforced material while the weight of the material is reduced with respect to pure glass fiber reinforced materials. In the exemplary embodiment, at least one of the main load bearing parts, stiffening sparcaps and the suction side shells are fabricated from such a hybrid material.

While the invention has been described in terms of various specific embodiments, those skilled in the art will recognize that the invention can be practiced with modification within the spirit and scope of the claims.

What is claimed is:

1. A wind turbine rotor blade comprising a pressure side spar cap and a suction side spar cap, wherein, of said pressure side spar cap and said suction side spar cap, only said suction side spar cap is fabricated from a material comprising a fiber reinforced matrix comprising at least one layer of glass fibers and at least one layer of carbon fibers embedded in a common matrix material.

2. A wind turbine rotor blade according to claim 1 wherein said glass fibers and said carbon fibers are arranged in mixed repeating layers of glass fibers and carbon fibers.

3. A wind turbine rotor blade according to claim 1 wherein at least one of said glass fibers and said carbon fibers are provided in the form of a non-woven fabric.

4. A wind turbine rotor blade according to claim 1 wherein at least one of said glass fibers and said carbon fibers are provided in the form of a woven fabric.

5. A wind turbine rotor blade according to claim 1 wherein at least one of said glass fibers and said carbon fibers are provided in the form of a roving fabric.

6. A wind turbine rotor blade according to claim 1 wherein said matrix material is selected from the group consisting of epoxy resin, epoxy novolacs, polyesters, polyimides, phenolic resins, and bismaleimides.

7. A wind turbine rotor blade according to claim 1 further comprising a pressure side shell and a suction side shell, wherein at least one of said pressure side shell and said suction side shell is fabricated from said fiber reinforced matrix.

8. A wind turbine rotor blade according to claim 1 wherein said glass fibers and said carbon fibers are distributed substantially uniformly within said matrix material.

9. A wind turbine rotor blade according to claim 1 wherein said fiber reinforced matrix is fabricated by layering a plurality of prefabricated mats of said carbon fibers and a plurality of prefabricated mats of said glass fibers.

10. A wind turbine rotor blade according to claim 1 wherein, of said wind turbine rotor blade, only said suction side spar cap is fabricated from said fiber reinforced matrix.

* * * * *